US008805841B2

(12) United States Patent
Takahashi

(10) Patent No.: US 8,805,841 B2
(45) Date of Patent: Aug. 12, 2014

(54) CLUSTERING SYSTEM, METHOD AND PROGRAM

(75) Inventor: Rikiya Takahashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/271,820

(22) Filed: Oct. 12, 2011

(65) Prior Publication Data

US 2012/0109975 A1    May 3, 2012

(30) Foreign Application Priority Data

Oct. 27, 2010   (JP) ................................. 2010-241065

(51) Int. Cl.
G06F 7/00         (2006.01)

(52) U.S. Cl.
USPC ....................................................... 707/737

(58) Field of Classification Search
CPC .......... G06F 17/5018; G06F 17/30265; G06F 17/30864; G06F 17/18; G06F 17/30253; G06F 17/5036; G06F 2217/16; G06F 17/30023; G06F 17/30705
USPC ....................................................... 707/737
See application file for complete search history.

(56) References Cited

U.S. PATENT DOCUMENTS

| 7,260,532 B2 | 8/2007 | Rees |
| 7,680,664 B2 | 3/2010 | Liu et al. |

FOREIGN PATENT DOCUMENTS

| JP | 2003331254 A | 11/2003 |
| JP | 2004152297 A | 5/2004 |
| JP | 2006039658 A | 2/2006 |
| JP | 2007293823 A | 11/2007 |
| JP | 2010003106 A | 1/2010 |

OTHER PUBLICATIONS

Danial Lashkari et al.,"Convex Clustering with Exemplar-Based Models," Advances in Neural Information Processing Systems; pp. 1-8; 2007.
Yasuhiro Fujiwara et al., "Fast Likelihood Search for Hidden Markov Models," ACM Transactions on Knowledge Discovery from Data, vol. V, No. N, pp. 1-36; Aug. 2009.
Kazumi, Kyosuke, et al., "Factor Analysis Models Representing Various Voice Characteristics for HMM Based Speech Synthesis", IEICE Technical Report, The Institute of Electronics Information and Communication Engineers, vol. 109, No. 356, pp. 177-182. (English Abstract Included).
Minagawa, Akihiro, et al., "Line Clustering with Vanishing Point and Vanishing Line Estimation", IPSJSIG Technical Reports, Information Processing Society of Japan, vol. 99, No. 3, pp. 65-72. (English Abstract Included).
Tokuno, Junichi, et al., "Minimum Classification Error Training with Automatic Control of Loss Smoothness" IPSJSIG Technical Reports, 2010(3) Information Processing Society of Japan, 2010, pp. 1-6. (English Abstract Included).
Ueda, Nanori, et al., "A Feature Extraction Method Based on the Latent Variable Models", IEICE Technical Report, The Institute of Electronics Information and Communication Engineers, vol. 98, No. 127, pp. 75-82. (English Abstract Included).

*Primary Examiner* — Truong Vo
(74) *Attorney, Agent, or Firm* — Cantor Colburn LLP

(57) ABSTRACT

A method for clustering a plurality of data items stored in a computer includes calculating, with the computer, a plurality of components comprising kernels based on a distribution that gives similarity between the data items, wherein a non-negative mixture weight is assigned to each of the kernels; preparing a set of active components that are composed of subscripts of the mixture weights; applying operations to the set of active components; and determining whether the mixture weight has converged, and if not converged yet, reapplying the operations to the set of components, and if the mixture weight has converged, clustering the data items based on the mixture weight.

25 Claims, 2 Drawing Sheets

CLUSTERING SYSTEM, METHOD AND PROGRAM

PRIORITY

This application claims priority to Japanese Patent Application No. 2010-241065, filed 27 Oct. 2010, and all the benefits accruing therefrom under 35 U.S.C. §119, the contents of which in its entirety are herein incorporated by reference.

BACKGROUND

The present invention relates to a technique for clustering a set of multiple data items having features.

Clustering is one of the more important techniques traditionally employed in such fields as statistical analysis, multivariate analysis, and data mining. According to one definition, clustering refers to grouping of a target set into subsets that achieve internal cohesion and external isolation.

Although simple in terms of computational complexity, typical existing clustering techniques, such as k-means for example, have a tendency to fall into local optimality. In addition, classification of results depends strongly on random initialization and lacks reproducibility.

D. Lashkari and P. Golland disclosed a convex clustering technique for optimizing a sparse mixture weight with limited kernel distribution for a Gaussian mixture model ("Convex clustering with exemplar-based models", Advances in Neural Information Processing Systems 20, J. Patt, D. Koller, Y. Singer and S. Roweis, Eds, Cambridge, Mass.: MIT Press, 2008, pp. 825-832). Although the convex clustering technique disclosed in the literature ensures global optimality of clusters, an EM algorithm used in the technique requires an extremely large number of iterative calculations and is not convenient in terms of computation time.

BRIEF SUMMARY

In one embodiment, a method for clustering a plurality of data items stored in a computer includes calculating, with the computer, a plurality of components comprising kernels based on a distribution that gives similarity between the data items, wherein a non-negative mixture weight is assigned to each of the kernels; preparing a set of active components that are composed of subscripts of the mixture weights; applying the following operations to the set of active components: selecting one kernel, $i$, from the plurality of kernels; selecting another kernel, $i'$, that has a positive weight and has a distribution close to the distribution represented by kernel, $i$; calculating a sum of weights of kernel $i$ and kernel $i'$; evaluating a first derivative of a negative likelihood function for the mixture weight; if the first derivative is positive at a point where the kernel $i$ has a weight of zero, updating the weight of kernel $i'$ using the sum of the weights of kernel $i$ and kernel $i'$, setting the weight of the kernel $i$ to zero, and pruning away component $i$ from the set of the active components; if the first derivative is negative at a point where the kernel $i'$ has a weight of zero, updating the weight of kernel $i$ using the sum of weights of kernel $i$ and kernel $i'$, setting the weight of the kernel $i'$ to zero, and pruning away component $i'$ from the set of the active components; if the likelihood function is not monotonic, executing uni-dimensional optimization on the mixture weight for the kernel $i$; and determining whether the mixture weight has converged, and if not converged yet, reapplying the operations to the set of components, and if the mixture weight has converged, clustering the data items based on the mixture weight.

In another embodiment, a non-transitory, computer readable medium having computer readable instructions stored thereon that, when executed by a computer, implement a method for clustering a plurality of data items. The method includes calculating a plurality of components comprising kernels based on a distribution that gives similarity between the data items, wherein a non-negative mixture weight is assigned to each of the kernel; preparing a set of active components that are composed of subscripts of the mixture weights; applying the following operations to the set of active components: selecting one kernel, $i$, from the plurality of kernels; selecting another kernel, $i'$, that has a positive weight and has a distribution close to the distribution represented by kernel $i$; calculating a sum of weights of kernel $i$ and kernel $i'$; evaluating a first derivative of a negative likelihood function for the mixture weight; if the first derivative is positive at a point where the kernel $i$ has a weight of zero, updating the weight of kernel $i'$ using the sum of the weights of kernel $i$ and kernel $i'$, setting the weight of kernel $i$ to zero, and pruning away component $i$ from the set of the active components; if the first derivative is negative at a point where the kernel $i'$ has a weight of zero, updating the weight of kernel $i$ using the sum of weights of kernel $i$ and kernel $i'$, setting the weight of the kernel $i'$ to zero, and pruning away component $i'$ from the set of active components; if the likelihood function is not monotonic, executing uni-dimensional optimization on the mixture weight for the kernel $i$; and determining whether the mixture weight has converged, and if not converged yet, reapplying the operations to the set of components, and if the mixture weight has converged, clustering the data items based on the mixture weight.

In another embodiment, a system for clustering a plurality of data items stored in storage device of a computer through processing by the computer. The system includes means for calculating a plurality of kernels based on a distribution that gives similarity between the data items, wherein a non-negative mixture weight is assigned to each of the kernel; means for preparing a set of active components that are composed of subscripts of the mixture weights; means for applying the following operations to the set of active components: selecting one kernel, $i$, from the plurality of kernels; selecting another kernel, $i'$, that has a positive weight and has a distribution close to the distribution represented by kernel, $i$; calculating a sum of weights of kernel $i$ and kernel $i'$; evaluating a first derivative of a negative likelihood function for the mixture weight; if the first derivative is positive at a point where the kernel $i$ has a weight of zero, updating the weight of kernel $i'$ using the sum of the weights of kernel $i$ and kernel $i'$, setting the weight of the kernel $i$ to zero, and pruning away component $i$ from the set of the active components; if the first derivative is negative at a point where the kernel $i'$ has a weight of zero, updating the weight of kernel $i$ using the sum of weights of kernel $i$ and kernel $i'$, setting the weight of the kernel $i'$ to zero, and pruning away component $i'$ from the set of active components; if the likelihood function is not monotonic, executing uni-dimensional optimization on the mixture weight for the kernel $i$; and means for determining whether the mixture weight has converged, and if not converged yet, reapplying the operations to the set of components, and if the mixture weight has converged, clustering the data items based on the mixture weight.

In another embodiment, a method for clustering a plurality of data items stored in a storage device of a computer includes calculating, with the computer, a plurality of kernels based on a distribution that gives similarity between the data items, wherein a non-negative mixture weight is assigned to each of the kernel; preparing a set of active components that are composed of subscripts of the mixture weights; selecting a subscript of a given kernel and a subscript of a kernel having a distribution close to the distribution represented by the given kernel from the set of active components; based on determination on monotonicity of a likelihood function for the mixture weight, pruning from active array components corresponding to one of the kernels and setting the corresponding mixture weight to 0, or pruning from active array components corresponding to another one of the kernels and setting the corresponding mixture weight to 0, or executing uni-dimensional optimization on one of the kernels; determining whether the mixture weight has converged; and in response to determining that the mixture weight has converged, clustering data items in the input data based on the mixture weight.

In still another embodiment, a non-transitory, computer readable medium having computer readable instructions stored thereon that, when executed by a computer, implement a method for clustering a plurality of data items. The method includes calculating a plurality of components called the kernels based on a distribution that gives similarity between the data items, wherein a non-negative mixture weight is assigned to each of the kernel; preparing a set of active components that are composed of subscripts of the mixture weights; selecting a subscript of a given kernel and a subscript of a kernel having a distribution close to the distribution represented by the given kernel from the set of active components; based on determination on monotonicity of a likelihood function for the mixture weight, pruning from active array components corresponding to one of the kernels and setting the corresponding mixture weight to 0, or pruning from active array components corresponding to another one of the kernels and setting the corresponding mixture weight to 0, or executing uni-dimensional optimization on one of the kernels and numerically updating the corresponding mixture weight; determining whether the mixture weight has converged; and in response to determining that the mixture weight has converged, clustering data items in input data based on the mixture weight and the active kernels.

DETAILED DESCRIPTION

Figure 1:
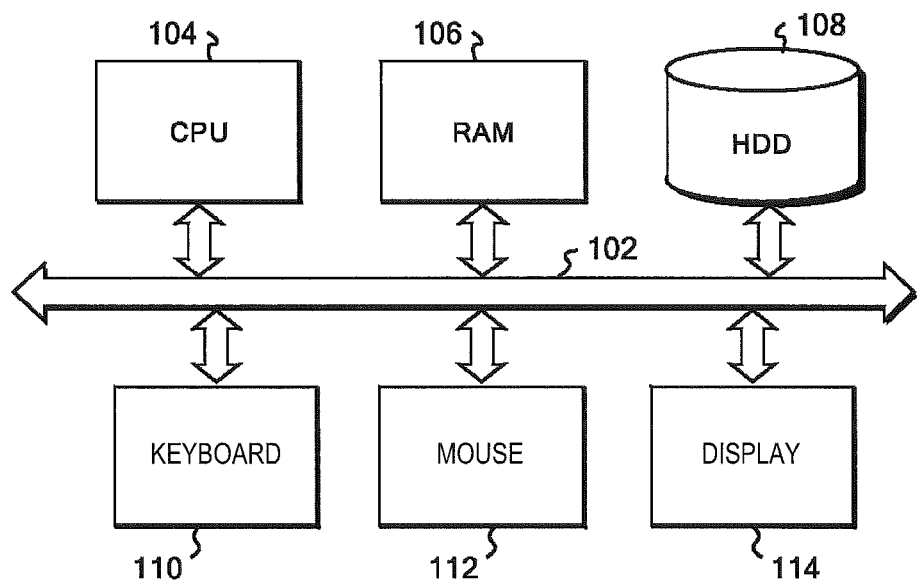
FIG. 1 is a block diagram of an exemplary hardware configuration for implementing an embodiment of the present invention.

The invention embodiments discussed herein provide global optimality of clusters by means of convex clustering while achieving faster processing. For example, an experiment conducted by the applicants showed that the number of iterative steps performed for acquiring a desired result was only about one hundredth or thousandth of that required in convex clustering using the EM algorithm.

An embodiment of the invention will be described below with respect to the drawings, throughout which the same reference numerals denote the same components unless otherwise specified. It should be understood that what is described below is an embodiment of the invention and is not intended to limit the invention to contents set forth in the embodiment(s).

Referring to FIG. 1, there is shown a block diagram of computer hardware for realizing system configuration and processing according to an embodiment of the invention. In FIG. 1, a system bus 102 is connected with a CPU 104, a main memory (RAM) 106, a hard disk drive (HDD) 108, a keyboard 110, a mouse 112, and a display 114. The CPU 104 is preferably based on a 32- or 64-bit architecture and may be Pentium (a trademark) 4, Core (a trademark) 2 Duo, Core (a trademark) 2 Quad, Xeon (a trademark) from Intel, or Athlon (a trademark) from AMD, for example. The main memory 106 is preferably has a capacity of 4 GB or larger. The hard disk drive 108 desirably has a capacity of 320 GB or larger, for example, so that it can store a large volume of data to be clustered.

Although not specifically shown, an operating system is prestored in the hard disk drive 108. The operating system may be any operating system compatible with the CPU 104, such as Linux (a trademark), Windows XP (a trademark), Windows (a trademark) 2000 from Microsoft, and Mac OS (a trademark) from Apple Inc. In the hard disk drive 108, program language processors for C, C++, C#, Java (a trademark) and the like are also stored. The program language processors are used for creating and maintaining modules or tools for clustering process described later. The hard disk drive 108 may also include a text editor for writing source code to be compiled by a program language processor and a developing environment, such as Eclipse (a trademark). The hard disk drive 108 also stores data to be clustered and processing modules for clustering, which will be described later with reference to the functional block diagram of FIG. 2.

The keyboard 110 and the mouse 112 are used for activating the operating system or a program (not shown) that has been loaded from the hard disk drive 108 to the main memory 106 and displayed on the display 114 and/or for typing in parameters or characters. The display 114 is preferably a liquid crystal display and may be of any resolution such as XGA (1024×768 resolution) and UXGA (1600×1200 resolution), for example. Although not shown, the display 114 is used for indicating the progress or final outcome of clustering.

Figure 2:
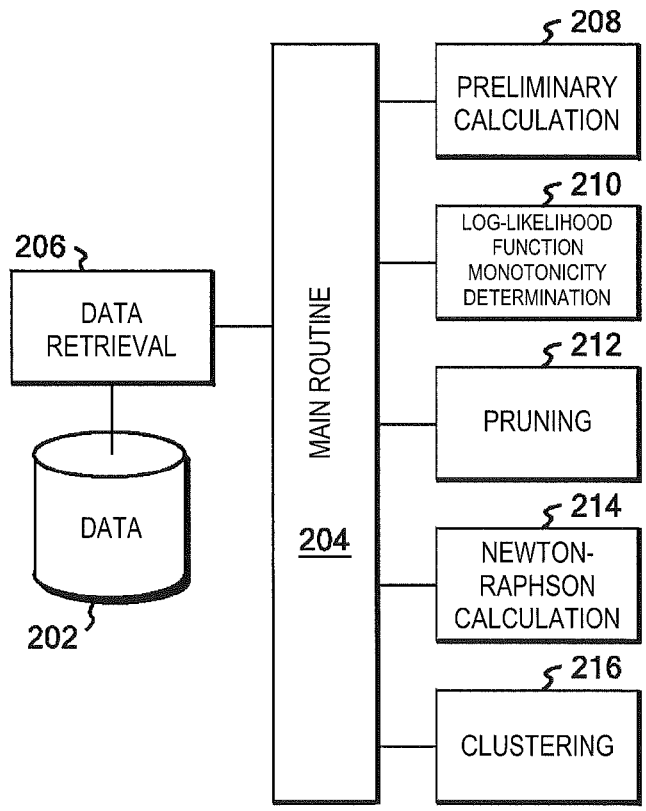
FIG. 2 is a functional logical block diagram according to an embodiment of the invention.

FIG. 2 is a functional block diagram of processing modules according to an embodiment of the invention. The modules, being written in an existing program language, such as C, C++, C#, Java (a trademark), are stored in the hard disk drive 108 in an executable binary format and loaded into the main memory 106 to be executed under control of the operating system (not shown) in response to an operation on the mouse 112 or the keyboard 110. In FIG. 2, data 202 stored in the hard disk drive 108 includes data to be clustered.

To execute data clustering, a system according to an embodiment of the invention includes a data retrieving module 206, a preliminary calculation module 208, a log-likelihood function monotonicity determining module 210, a pruning module 212, a Newton-Raphson calculation module 214, a clustering module 216, and a main routine 204 that calls the modules as necessary and controls the entire processing.

The data retrieving module 206 retrieves data from the data 202 and converts each datum into a multidimensional vector format. In doing so, the data retrieving module 206 also performs dimensional reduction, normalization or the like as necessary. The preliminary calculation module 208 prepares a kernel matrix composed of kernels calculated based on a distribution that gives similarity between input data vectors, and performs processing such as assigning a non-negative mixture weight to each kernel. The preliminary calculation module 208 also prepares an active index array and temporary variables. The log-likelihood function monotonicity determining module 210 performs processing for determining monotonicity of a log-likelihood function for a mixture weight of a specific kernel. The pruning module 212 prunes away components from an active index array.

The Newton-Raphson calculation module 214 updates the value of a mixture weight so as to converge it in accordance with specific conditions for determination used by the log-likelihood function monotonicity determining module 210. The clustering module 216 clusters a set of data exemplars in the form of multidimensional vectors based on the value of the converged mixture weight.

The main routine 204 calls the data retrieving module 206, preliminary calculation module 208, log-likelihood function monotonicity determining module 210, pruning module 212, Newton-Raphson calculation module 214, and clustering module 216 as necessary, and provides control so as to carry forward processing.

Figure 3:
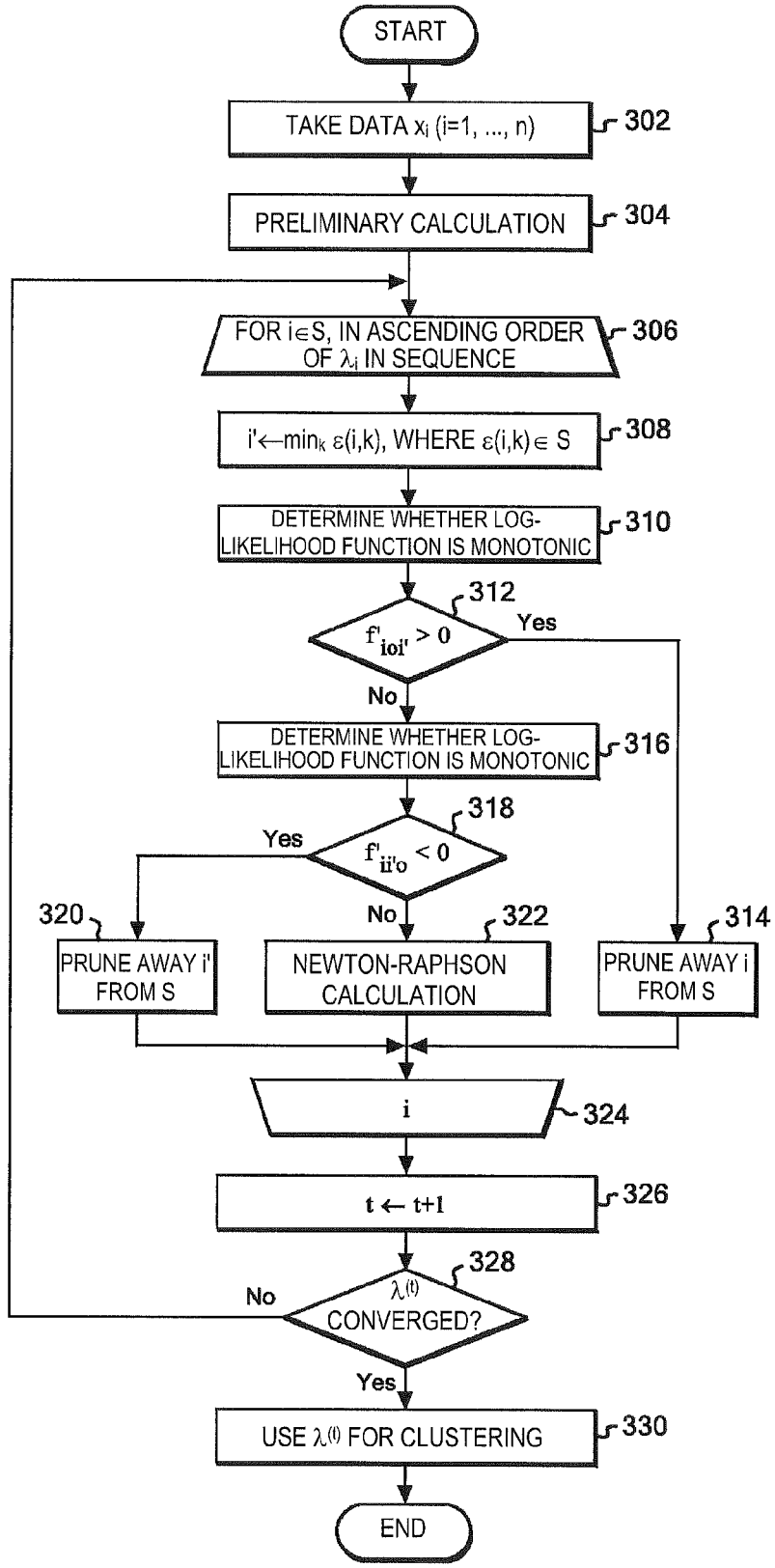
FIG. 3 is a flowchart of a clustering process according to an embodiment of the present invention.

Referring now to the flowchart of FIG. 3, a clustering process will be described that is executed by the main route 204 calling the data retrieving module 206, preliminary calculation module 208, log-likelihood function monotonicity determining module 210, pruning module 212, Newton-Raphson calculation module 214, and clustering module 216 as necessary.

At block 302, the main routine 204 calls the data retrieving module 206 to retrieve data from the data 202, forming n vector data, $x_1, x_2, \ldots, x_n$, where n is the number of data exemplars to be clustered. It is assumed that each vector data, $x_i$ (i=1, ..., n), is a d-dimensional vector, where d is the number of features included in each datum i.e., $x_i = (x_{i1}, x_{i2}, \ldots, x_{id})^T$. The main routine 204 then calls the preliminary calculation module 208 at step 304. Then, the preliminary calculation module 208 determines m kernel vectors, $k_i$ (i=1, ..., m), and m kernel parameters, $\theta_i$ (i=1, ..., m). Although the magnitude of n and m may be in any relationship, it is assumed that n=m for convenience. Kernel vector, $k_i$, is defined as similarity between data exemplars according to the formula:

$$k_i = (p(x_1|\theta_i), p(x_2|\theta_i), \ldots, p(x_n|\theta_i))^T.$$

That is, $k_{ij} \equiv p(x_j|\theta_i)$.

In an embodiment, $\theta_i$ is a natural parameter for Gaussian distribution associated with the i-th data exemplar, $x_i$, i.e., $\theta_i = (x_i, \sigma_i^2)$ for i=1, ..., m.

Thus, $k_{ij} = p(x_j|x_i, \sigma_i^2)$.

Here, $\sigma_i^2$ is locally-adaptive isotropic variance based on the nearest neighbor method or pilot kernel density estimation and may be given by a formula like:

$$\sigma_i^2 = \frac{1}{nd} \sum_{j=1}^{n} \|x_{\epsilon(i,j)} - x_i\|_2^2 \qquad \text{[Formula 1]}$$

where $\epsilon(i,j)$ represents j-nearest neighbor for i, i.e., the index of a datum that is j-th nearest to the i-th data exemplar. Also, $\|\ldots\|_2$ represents Euclidean norm. Further, nearest neighbor methods utilize the Euclidean norm of a vector that captures the difference between two data exemplars.

When expressed more specifically using the value of $\sigma_i$, $k_{ij}$ is:

$$k_{ij} = \frac{1}{\left(\sqrt{2\pi\sigma_i^2}\right)^d} \exp\left(-\frac{\|x_j - x_i\|^2}{2\sigma_i^2}\right) \qquad \text{[Formula 2]}$$

$$= \frac{1}{\left(\sqrt{2\pi\sigma_i^2}\right)^d} \exp\left(-\frac{\sum_{r=1}^{d}(x_{jr} - x_{ir})^2}{2\sigma_i^2}\right)$$

Next, the initial value of the mixture weight vector, $\lambda$, is given as:

$$\equiv (\lambda_1 = 1/m, \ldots, \lambda_m = 1/m).$$

Next, the initial value of an active index array, i.e., a set S of active components, is given as:

$$S = \{1, 2, \ldots, m\}.$$

Then, for each i=1, ..., m, indices $(\epsilon(i,1), \ldots, \epsilon(i,m-1))$ are sorted and cached so that $\epsilon(i,k)$ is the k-th nearest neighbor of i.

Further, temporary variables are allocated as:

$$v = (v_1, v_2, \ldots, v_n)^T, \text{ and}$$

$$z = (z_1, z_2, \ldots, z_n)^T$$

For iterative calculations that follow, t is allocated as a variable to indicate the number of times iterative calculations are performed. As iterative calculations have not been performed yet at the start, 0 is assigned to t.

With t, $\lambda^{(t)}$ is defined as the value of $\lambda$ at the t-th iteration of calculation. Accordingly, the initial value of $\lambda$ is $\lambda^{(0)}$. The j-th component of $\lambda$ at the t-th iteration of calculation is denoted as $\lambda_j^{(t)}$. Meanwhile, a matrix constituted by m kernel vectors, $k_i$ (i=1, ..., m), i.e., $K = (k_1, k_2, \ldots, k_m)$, is called a kernel matrix. This is generally an n×m matrix.

Thus, $K\lambda^{(0)}$ is assigned to z. The process described thus far corresponds to block 304, an initialization process performed by the preliminary calculation module 208. The following process is iterative calculation. Subsequent blocks 306 through 324 are iterative calculations performed for i∈S in ascending order of $\lambda_i$. The main routine 204 selects certain i at block 306 and then i'←$\min_k \epsilon(i,k)$ at block 308, where i' is selected based on i in accordance with $\epsilon(i,k) \in S$. When the process at block 308 is complete, an index pair (i,i') has been selected.

At block 310, the main routine 204 calls the log-likelihood function monotonicity determining module 210 with the index pair (i,i'). Specifically, the log-likelihood function monotonicity determining module 210 performs such calculations as:

$$v \leftarrow z + \lambda_i^{(t)}(k_{i'} - k_i) \qquad \text{[Formula 3]}$$

$$f'_{i0i'} \leftarrow -\sum_{j=1}^{n}(k_{ij} - k_{i'j})/v_j$$

At block 312, the main routine 204 determines whether the resulting value, $f_{i0i'}$, is positive. If the value is positive, the main routine 204 calls the pruning module 212 at step 314 to prune away i from S. More specifically, this pruning is done by the following process:

$$\lambda_i^{(t+1)} \leftarrow 0$$

$$\lambda_{i'}^{(t+1)} \leftarrow \lambda_{i'}^{(t)} + \lambda_i^{(t)}$$

$$z \leftarrow v$$

Remove i from S.

The flow then proceeds at block 324 to process the next i. Returning to block 312, if $f_{i0i'}$ is not >0, the main routine 204 proceeds to block 316 to call the log-likelihood function monotonicity determining module 210 with the index pair (i,i'). The log-likelihood function monotonicity determining module 210 specifically performs such calculations as:

$$v \leftarrow z + \lambda_{i'}^{(t)}(k_i - k_{i'})$$ [Formula 4]

$$f'_{ii'0} \leftarrow -\sum_{j=1}^{n}(k_{ij} - k_{i'j})/v_j$$

It will be noted that the index i,j is used in a somewhat different way from block 310. The main routine 204 determines at block 318 whether the resulting value, f'$_{ii'0}$, is negative, and if negative, it calls the pruning module 212 at block 320 to prune away i from S. More specifically, this pruning is done by the following process:

$$\lambda_{i'}^{(t+1)} \leftarrow 0$$

$$\lambda_{i}^{(t+1)} \leftarrow \lambda_{i}^{(t)} + \lambda_{i'}^{(t)}$$

$$z \leftarrow v$$

Remove i' from S.

Then, at block 324, the next i is processed. If the value f'$_{ii'0}$ is not <0 at block 318, the main routine 204 calls the Newton-Raphson calculation module 214 at block 322 to perform the following calculations:

$$h_{ii'}^{(1)} \leftarrow -\sum_{j=1}^{n}(k_{ij} - k_{i'j})/z_j$$ [Formula 5]

$$h_{ii'}^{(2)} \leftarrow -\sum_{j=1}^{n}(k_{ij} - k_{i'j})^2/z_j^2$$

$$\lambda_{i}^{(t+1)} \leftarrow \lambda_{i}^{(t)} - h_{ii'}^{(1)}/h_{ii'}^{(2)}$$

$$\lambda_{i'}^{(t+1)} \leftarrow \lambda_{i}^{(t)} + \lambda_{i'}^{(t)} - \lambda_{i}^{(t+1)}$$

$$z \leftarrow z + (\lambda_{i}^{(t+1)} - \lambda_{i}^{(t)})k_i + (\lambda_{i'}^{(t+1)} - \lambda_{i'}^{(t)})k_{i'}$$

Then, at block 324, the next i is processed.

Having completed the loop from block 306 through 324 for i, the main routine 204 increments t by one at block 326 and determines whether $\lambda^{(t)}$ has converged at block 328. This determination considers $\lambda^{(t)}$ to be converged on the condition that $\|\lambda^{(t)} - \lambda^{(t-1)}\| < \epsilon$, where $\epsilon$ is a certain predetermined positive threshold value. The norm $\|\ldots\|$ used here may be any type of norm, such as Euclidian or Manhattan norm.

If it is determined at block 326 that $\|\lambda^{(t)} - \lambda^{(t-1)}\|$ is not <$\epsilon$, the process returns to block 306, where iterative calculation for i∈S in ascending order of $\lambda_i$ is performed from the start. However, if it is determined at block 326 that $\|\lambda^{(t)} - \lambda^{(t-1)}\| < \epsilon$, the main routine 204 proceeds at block 330 to call the clustering module 216.

Due to the nature of convex clustering, most elements of $\lambda^{(t)} \equiv (\lambda_1^{(t)}, \lambda_2^{(t)}, \ldots, \lambda_m^{(t)})$ are 0 except those of the active components, i.e., some $\lambda_i^{(t)}$'s. The clustering module 216 thus chooses i for which $\lambda_i^{(t)}k_{ij}$ is largest as a cluster to which each vector data $x_j$ (j=1, 2, ..., n) should belong. Here, only i of $\lambda_i^{(t)}$ that is positive can be selected as the cluster index.

Although the calculations performed by the preliminary calculation module 208 shown above assume that similarity between data exemplars is Gaussian distribution, this is not limiting, and Dirichlet compound multinomial distribution (also known as Polya distribution) may be used instead, for example. In this case, $k_{ij}$ is defined by:

$$k_{ij} = p(x_j|\theta_i) = \frac{\Gamma(\alpha)}{\Gamma\left(\alpha + \sum_{k=1}^{d} x_{jk}\right)} \prod_{k=1}^{d} \frac{\Gamma(\alpha\mu_{ik} + x_{jk})}{\Gamma(\alpha\mu_{ik})}$$ [Formula 6]

In this case, $\theta_i = (\mu_{i1}, \mu_{i2}, \ldots, \mu_{id}, \alpha)$.

Thus, $\mu_{ik}$ is given as follows, for additive smoothing:

$$\mu_{ik} = \frac{\frac{\beta}{d} + x_{ik}}{\beta + \|x_i\|_1}$$ [Formula 7]

For subtractive smoothing:

$$\mu_{ik} = \frac{\max\{x_{ik} - \delta, 0\}}{\|x_i\|_1} + \frac{\delta \sum_{j=1}^{d} I(x_{ij} > 0)}{\|x_i\|_1} \cdot \frac{1}{d}$$ [Formula 8]

In the equations, $\alpha$, $\beta$, and $\delta$ are discounting factors and $\|\ldots\|_1$ represents Manhattan norm.

Distribution used in the invention embodiments to give similarity between datum i and datum j is not limited to an exponential distribution family, such as Gaussian distribution or Dirichlet compound multinomial distribution, but any distribution appropriate for the nature of data to be clustered may be used.

Although the calculation shown above determines monotonicity of a log-likelihood function, it should be understood that it is equivalent to simply determining the monotonicity of a likelihood function because taking a logarithm does not affect monotonicity determination.

In addition, although the calculation shown above uses Newton-Raphson method for uni-dimensional optimization, this is not limiting. It is also possible to employ the bisection method, which is a root finding algorithm for solving an equation by repeating an operation to determine the midpoint of an interval containing the solution, or the secant method which uses a straight line (or a secant) connecting between two points in place of a tangent line used in the Newton-Raphson method and considers the point at which the straight line intersects the x-axis as the next approximate solution.

In addition, the invention can be practiced with any hardware, software, and a platform of a computer. If a multi-core or multi-processor is used, faster processing can be realized by allocating processing among a number of CPUs in calculation of f'$_{iOi'}$, for determining the monotonicity of the log-likelihood function.

The invention claimed is:

1. A method for clustering a plurality of data items stored in a computer, the method comprising:
    calculating, with the computer, a plurality of components comprising kernels based on a distribution that gives similarity between the data items, wherein a non-negative mixture weight is assigned to each of the kernels;
    preparing a set of active components that are composed of subscripts of the mixture weights;
    applying the following operations to the set of active components:

selecting one kernel, i, from the plurality of kernels;
selecting another kernel, i', that has a positive weight and has a distribution close to the distribution represented by kernel, i;
calculating a sum of weights of kernel i and kernel i';
evaluating a first derivative of a negative likelihood function for the mixture weight;
if the first derivative is positive at a point where the kernel i has a weight of zero, updating the weight of kernel i' using the sum of the weights of kernel i and kernel i', setting the weight of the kernel i to zero, and pruning away component i from the set of the active components;
if the first derivative is negative at a point where the kernel i' has a weight of zero, updating the weight of kernel i using the sum of weights of kernel i and kernel i', setting the weight of the kernel i' to zero, and pruning away component i' from the set of the active components;
if the likelihood function is not monotonic, executing uni-dimensional optimization on the mixture weight for the kernel i; and
determining whether the mixture weight has converged, and if not converged yet, reapplying the operations to the set of components, and if the mixture weight has converged, clustering the data items based on the mixture weight.

2. The method according to claim 1, wherein the clustering determines a cluster to which a data item is to belong based on a subscript for which a product of a non-zero element of the converged mixture weight vector and the score using the corresponding kernel is largest.

3. The method according to claim 1, wherein the distribution that gives similarity between the data items is Gaussian distribution.

4. The method according to claim 1, wherein the distribution that gives similarity between the data items is Dirichlet compound multinomial distribution.

5. The method according to claim 1, wherein the uni-dimensional optimization is based on Newton-Raphson method.

6. A non-transitory, computer readable medium having computer readable instructions stored thereon that, when executed by a computer, implement a method for clustering a plurality of data items, the method comprising:
calculating a plurality of components comprising kernels based on a distribution that gives similarity between the data items, wherein a non-negative mixture weight is assigned to each of the kernel;
preparing a set of active components that are composed of subscripts of the mixture weights;
applying the following operations to the set of active components:
selecting one kernel, i, from the plurality of kernels;
selecting another kernel, i', that has a positive weight and has a distribution close to the distribution represented by kernel i;
calculating a sum of weights of kernel i and kernel i';
evaluating a first derivative of a negative likelihood function for the mixture weight;
if the first derivative is positive at a point where the kernel i has a weight of zero, updating the weight of kernel i' using the sum of the weights of kernel i and kernel i', setting the weight of kernel i to zero, and pruning away component i from the set of the active components;
if the first derivative is negative at a point where the kernel i' has a weight of zero, updating the weight of kernel i using the sum of weights of kernel i and kernel i', setting the weight of the kernel i' to zero, and pruning away component i' from the set of active components;
if the likelihood function is not monotonic, executing uni-dimensional optimization on the mixture weight for the kernel i; and
determining whether the mixture weight has converged, and if not converged yet, reapplying the operations to the set of components, and if the mixture weight has converged, clustering the data items based on the mixture weight.

7. The computer readable medium according to claim 6, wherein the clustering determines a cluster to which a data item is to belong based on a subscript for which a product of a non-zero element of the converged mixture weight vector and the score using the corresponding kernel is largest.

8. The computer readable medium according to claim 6, wherein the distribution that gives similarity between the data items is Gaussian distribution.

9. The computer readable medium according to claim 6, wherein the distribution that gives similarity between the data items is Dirichlet compound multinomial distribution.

10. The computer readable medium according to claim 6, wherein the uni-dimensional optimization is based on Newton-Raphson method.

11. A system for clustering a plurality of data items stored in storage device of a computer through processing by the computer, the system comprising:
means for calculating a plurality of kernels based on a distribution that gives similarity between the data items, wherein a non-negative mixture weight is assigned to each of the kernel;
means for preparing a set of active components that are composed of subscripts of the mixture weights;
means for applying the following operations to the set of active components:
selecting one kernel, i, from the plurality of kernels;
selecting another kernel, i', that has a positive weight and has a distribution close to the distribution represented by kernel, i;
calculating a sum of weights of kernel i and kernel i';
evaluating a first derivative of a negative likelihood function for the mixture weight;
if the first derivative is positive at a point where the kernel i has a weight of zero, updating the weight of kernel i' using the sum of the weights of kernel i and kernel i', setting the weight of the kernel i to zero, and pruning away component i from the set of the active components;
if the first derivative is negative at a point where the kernel i' has a weight of zero, updating the weight of kernel i using the sum of weights of kernel i and kernel i', setting the weight of the kernel i' to zero, and pruning away component i' from the set of active components;
if the likelihood function is not monotonic, executing uni-dimensional optimization on the mixture weight for the kernel i; and
means for determining whether the mixture weight has converged, and if not converged yet, reapplying the operations to the set of components, and if the mixture weight has converged, clustering the data items based on the mixture weight.

12. The system according to claim 11, wherein the clustering means determines a cluster to which a data item is to belong based on a subscript for which a product of a non-zero element of the converged mixture weight vector and the score using the corresponding kernel is largest.

13. The system according to claim 11, wherein the distribution that gives similarity between the data items is Gaussian distribution.

14. The system according to claim 11, wherein the distribution that gives similarity between the data items is Dirichlet compound multinomial distribution.

15. The system according to claim 11, wherein the uni-dimensional optimization is based on Newton-Raphson method.

16. A method for clustering a plurality of data items stored in a storage device of a computer, the method comprising:
calculating, with the computer, a plurality of kernels based on a distribution that gives similarity between the data items, wherein a non-negative mixture weight is assigned to each of the kernel;
preparing a set of active components that are composed of subscripts of the mixture weights;
selecting a subscript of a given kernel and a subscript of a kernel having a distribution close to the distribution represented by the given kernel from the set of active components;
based on determination on monotonicity of a likelihood function for the mixture weight, pruning from active array components corresponding to one of the kernels and setting the corresponding mixture weight to 0, or pruning from active array components corresponding to another one of the kernels and setting the corresponding mixture weight to 0, or executing uni-dimensional optimization on one of the kernels;
determining whether the mixture weight has converged; and
in response to determining that the mixture weight has converged, clustering data items in the input data based on the mixture weight.

17. The method according to claim 16, wherein the clustering determines a cluster to which a data item is to belong based on a subscript for which a product of a non-zero element of the converged mixture weight vector and the score using the corresponding kernel is largest.

18. The method according to claim 16, wherein the distribution that gives similarity between the data items is Gaussian distribution.

19. The method according to claim 16, wherein the distribution that gives similarity between the data items is Dirichlet compound multinomial distribution.

20. The method according to claim 16, wherein the uni-dimensional optimization is based on Newton-Raphson method.

21. A non-transitory, computer readable medium having computer readable instructions stored thereon that, when executed by a computer, implement a method for clustering a plurality of data items, the method comprising:
calculating a plurality of components called the kernels based on a distribution that gives similarity between the data items, wherein a non-negative mixture weight is assigned to each of the kernel;
preparing a set of active components that are composed of subscripts of the mixture weights;
selecting a subscript of a given kernel and a subscript of a kernel having a distribution close to the distribution represented by the given kernel from the set of active components;
based on determination on monotonicity of a likelihood function for the mixture weight, pruning from active array components corresponding to one of the kernels and setting the corresponding mixture weight to 0, or pruning from active array components corresponding to another one of the kernels and setting the corresponding mixture weight to 0, or executing uni-dimensional optimization on one of the kernels and numerically updating the corresponding mixture weight;
determining whether the mixture weight has converged; and
in response to determining that the mixture weight has converged, clustering data items in input data based on the mixture weight and the active kernels.

22. The computer readable medium according to claim 21, wherein the clustering determines a cluster to which a data item is to belong based on a subscript for which a product of a non-zero element of the converged mixture weight vector and the score using the corresponding kernel is largest.

23. The computer readable medium according to claim 21, wherein the distribution that gives similarity between the data items is Gaussian distribution.

24. The computer readable medium according to claim 21, wherein the distribution that gives similarity between the data items is Dirichlet compound multinomial distribution.

25. The computer readable medium according to claim 21, wherein the uni-dimensional optimization is based on Newton-Raphson method.

* * * * *